United States Patent
Zhang et al.

(10) Patent No.: US 11,122,323 B2
(45) Date of Patent: Sep. 14, 2021

(54) SMART TELEVISION SIGNAL SOURCE-BASED METHOD FOR DISPLAYING FLOATING MENU AND SMART TELEVISION

(71) Applicant: SHENZHEN CHUANGWEI-RGB ELECTRONIC CO., LTD., Shenzhen (CN)

(72) Inventors: Renchao Zhang, Shenzhen (CN); Na Qi, Shenzhen (CN); Rong Shen, Shenzhen (CN); Jing Cheng, Shenzhen (CN)

(73) Assignee: SHENZHEN CHUANGWEI-RGB ELECTRONIC CO., LTD., Shenzhen (CN)

( * ) Notice: Subject to any disclaimer, the term of this patent is extended or adjusted under 35 U.S.C. 154(b) by 79 days.

(21) Appl. No.: 16/484,060

(22) PCT Filed: Feb. 10, 2018

(86) PCT No.: PCT/CN2018/076105
§ 371 (c)(1),
(2) Date: Aug. 6, 2019

(87) PCT Pub. No.: WO2019/033726
PCT Pub. Date: Feb. 21, 2019

(65) Prior Publication Data
US 2019/0394520 A1 Dec. 26, 2019

(30) Foreign Application Priority Data
Aug. 18, 2017 (CN) .......................... 201710713484.8

(51) Int. Cl.
*H04N 21/431* (2011.01)
*H04N 21/41* (2011.01)
*H04N 21/485* (2011.01)

(52) U.S. Cl.
CPC ..... *H04N 21/4314* (2013.01); *H04N 21/4104* (2013.01); *H04N 21/485* (2013.01)

(58) Field of Classification Search
CPC .......... H04N 21/4314; H04N 21/4104; H04N 21/485; H04N 21/4312
See application file for complete search history.

(56) References Cited

U.S. PATENT DOCUMENTS

2008/0178214 A1* 7/2008 Shivaji-Rao ........... H04N 5/445
2009/0049205 A1 2/2009 Park
(Continued)

FOREIGN PATENT DOCUMENTS

CN 101304497 A 11/2008
CN 103606357 A 2/2014
(Continued)

OTHER PUBLICATIONS

World Intellectual Property Organization (WIPO) International Search Report for PCT/CN2018/076105 May 23, 2018 7 Pages.

*Primary Examiner* — Anthony Bantamoi
(74) *Attorney, Agent, or Firm* — Anova Law Group, PLLC

(57) ABSTRACT

Smart television signal source-based method for displaying floating menu and smart television, comprising: calling floating menu to any position on current page when receiving signal source forced to be broadcast; floating menu acquiring signal source channel, and, according to system file configuration, acquiring configuration entries requiring display by current smart television model, before displaying on current page; configuration entries automatically undergoing dynamic sorting according to current system status. Through calling floating menu to current page when receiving signal source and, according to system file configuration, displaying configuration entries corresponding to smart television model for adjustment by user, present invention (Continued)

effectively solves problem, when adjusting configuration entries in existing televisions, one must review main page before entering menu locating configuration entry, causing regulation path long and steps tedious while adjustment effect on current playback screen image not being viewed.

15 Claims, 5 Drawing Sheets

(56) References Cited

U.S. PATENT DOCUMENTS

| | | | |
|---|---|---|---|
| 2009/0204929 A1* | 8/2009 | Baurmann | G06F 3/048 |
| 2010/0138789 A1* | 6/2010 | Park | G06F 3/048 |
| 2014/0362294 A1* | 12/2014 | Majid | H04N 5/445 |
| 2015/0264422 A1* | 9/2015 | Wang | H04N 21/4222 |
| 2018/0157385 A1* | 6/2018 | Sirpal | G06F 3/0482 |

FOREIGN PATENT DOCUMENTS

| | | | |
|---|---|---|---|
| CN | 104378694 A | | 2/2015 |
| CN | 105227988 A | | 1/2016 |
| CN | 105338395 A | | 2/2016 |
| CN | 105792017 A | | 7/2016 |
| CN | 107396167 A | | 11/2017 |

* cited by examiner

SMART TELEVISION SIGNAL SOURCE-BASED METHOD FOR DISPLAYING FLOATING MENU AND SMART TELEVISION

CROSS-REFERENCES TO RELATED APPLICATIONS

This application is a national stage application of PCT Patent Application No. PCT/CN2018/076105, filed on Feb. 10, 2018, which claims priority to Chinese Patent Application No. 201710713484.8, filed on Aug. 18, 2017, the content of all of which is incorporated herein by reference.

FIELD OF THE INVENTION

The present invention relates to the field of smart television technology, and more particularly, to a smart television signal source-based method for displaying a floating menu and a smart television.

BACKGROUND

In a production and a life, people often encounter a plurality of situations requiring adjusting a plurality of configuration entries on a television screen during watching a smart television, including: adjusting a backlight of an image on a playback screen, a color, a saturation, and more. However, currently, when adjusting the configuration entries of a smart television, a homepage must be called out first, before entering a setting entry of a system from the homepage, followed by finding before adjusting an item needs to be set in a plurality of configuration entries. In most cases, a user needs to adjust an image on a current playback screen, and in such a case, when entering a setting through the homepage, a current playback content will be released, and only one sample video may be displayed while the user is adjusting the image, thus the user cannot view an effect of an adjusted current playback screen at all. And after finishing an adjustment, the user has to return step by step until reaching an original viewing page.

Therefore, the current technology needs to be improved and developed.

BRIEF SUMMARY OF THE DISCLOSURE

According to the above described defects, the purpose of the present invention is providing a smart television signal source-based method for displaying a floating menu and a smart television, in order to solve a plurality of technical problems in the prior art that, when adjusting a configuration entry of a current television, one has to go through the homepage before entering a menu which the configuration entry locates at, thus causing a regulation path to be long, a step to be tedious, and an adjustment effect of an image on the current playback screen not being able to be viewed directly.

In order to achieve the above mentioned goals, the technical solution of the present invention to solve the technical problems is as follows:

A smart television signal source-based method for displaying a floating menu, wherein the method comprising:
calling a floating menu out to any position on a current page, when the smart television receives a mandatory broadcast signal source;
the floating menu acquires a signal source channel, obtains and displays on the current page a plurality of configuration entries that a current smart television model requires to display according to a system file configuration;
dynamically sorting the configuration entries automatically according to a current state of the system.

The smart television signal source-based method for displaying a floating menu, wherein before calling the floating menu out to any one position on the current page when the smart television receives the mandatory broadcast signal source, the method further includes:
when the smart television receives that a user has pressed a button for the signal source, the smart television adopts an Android system broadcast method to force the button to be distributed before outputting to a system and a plurality of application terminals of the smart television.

The smart television signal source-based method for displaying a floating menu, wherein when the smart television receives that the user has pressed the button for the signal source, the smart television adopts the Android system broadcast method to force the button to be distributed and output to the system and the application terminals of the smart television, comprises specifically:
the smart television receives that the user has pressed the button for the signal source;
the smart television starts the Android system broadcast;
the Android system broadcast forces the button to be distributed and output to the system and the application terminals of the smart television.

The smart television signal source-based method for displaying a floating menu, wherein when the configuration entry is clicked, the configuration entry itself is floated alone and highlighted on the current page, for adjusting by the user.

The smart television signal source-based method for displaying a floating menu, wherein the configuration entry calls out the floating menu through the signal source in any one playing scene, and the configuration entry is floating on the current page when being clicked for an adjustment, without interrupting a screen currently on play, while the configuration entries are configured through a file, making different television models configure different configuration entries.

The smart television signal source-based method for displaying a floating menu, wherein after completing an adjustment, if the user pressed the button for the signal source is detected again, the floating menu is then quit.

The smart television signal source-based method for displaying a floating menu, wherein the floating menu acquires the signal source channel, obtains and displays the configuration entries to be displayed on the current smart television model according to the system file configuration, comprising specifically:
the floating menu acquiring the signal source channel;
calling big data information, obtaining before displaying a common configuration entry;
calling a system file configuration and obtaining the current smart television model;
displaying the configuration entries on the current page that the current smart television model needs to display.

The smart television signal source-based method for displaying a floating menu, wherein dynamically sorting the configuration entries automatically according to the current state of the system, comprising specifically:
the configuration entry obtains a current state of the system and determines whether there is a signal or not;
the configuration entries are dynamically sorted in a real time automatically based on if there is or is not a signal.

The smart television signal source-based method for displaying a floating menu, wherein when the configuration entry obtains a current state of the system is offline, a position of a network configuration entry will be placed ahead.

The smart television signal source-based method for displaying a floating menu, wherein when the configuration entry obtains a current state of the system is having an upgrade package, a position of an upgradation configuration entry will be placed ahead.

The smart television signal source-based method for displaying a floating menu, wherein the floating menu will be automatically hidden after the user has completed the adjustment, if there is no display instruction received during a first preset time threshold.

The smart television signal source-based method for displaying a floating menu, wherein the configuration entry will be automatically quit after the user has completed the adjustment, if there is no adjustment instruction received during a second preset time threshold.

The smart television signal source-based method for displaying a floating menu, wherein the first preset time threshold is 5-60 seconds.

The smart television signal source-based method for displaying a floating menu, wherein the second preset time threshold is 5-30 seconds.

A smart television, wherein comprising: a floating menu, while displaying the floating menu comprises a plurality of methods described above.

Benefits: the present invention provides a smart television signal source-based method for displaying a floating menu and a smart television, the method comprising: when a smart television receives a mandatory broadcast signal source, a floating menu is called out to any position on a current page; the floating menu acquires a signal source channel, obtains and displays on the current page a plurality of configuration entries that a current smart television model requires to display according to a system file configuration; and the configuration entries are dynamically sorted automatically according to a current state of the system. By means of calling out the floating menu to the current page when receiving the signal source, and displaying the configuration entries for the user to adjust, corresponding to the current smart television model according to the system file configuration, the present invention has effectively solved the problems in a current television that, when adjusting the configuration entries, it is required to enter the menu where the configuration entries locate after going through the homepage first, thus causing a regulation path to be long, a step to be tedious, and no way to directly view an adjustment effect of an image on a currently playing screen.

DETAILED DESCRIPTION OF EMBODIMENTS

In order to make the purpose, technical solution and the advantages of the present invention clearer and more explicit, further detailed descriptions of the present invention are stated here, referencing to the attached drawings and some preferred embodiments of the present invention. It should be understood that the detailed embodiments of the invention described here are used to explain the present invention only, instead of limiting the present invention.

Figure 1:
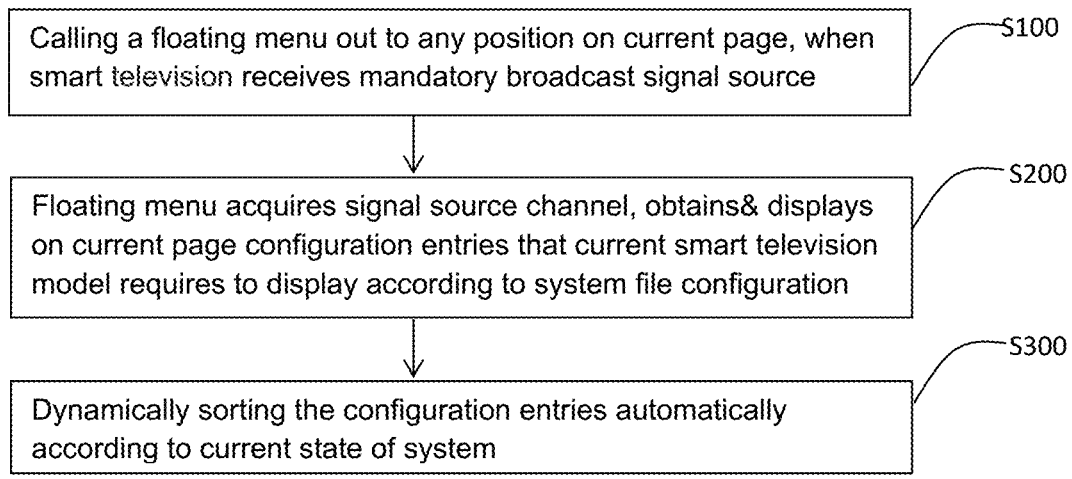
FIG. 1 illustrates a flowchart of a preferred embodiment on a smart television signal source-based method for displaying a floating menu described in the present invention.

Referencing to FIG. 1, which illustrates a flowchart of a preferred embodiment on a smart television signal source-based method for displaying a floating menu described in the present invention. As shown in FIG. 1, the method comprises a plurality of steps:

Step S100. Calling a floating menu out to any one position on a current page, when the smart television receives a mandatory broadcast signal source.

Step S200. The floating menu acquires a signal source channel, obtains and displays on the current page a plurality of configuration entries that a current smart television model requires to display according to a system file configuration.

Step S300. Dynamically sorting the configuration entries automatically according to a current state of the system.

Before the step S100, it further comprises:

P100. When receiving that a user has pressed a button for the signal source, the smart television adopts an Android system broadcast method to force the button to be distributed before outputting to a system and a plurality of application terminals of the smart television.

It should be noted that, both the signal source for a smart television and the configuration entries in the menu of a smart television are a common technology, however, through combining the signal source and the configuration entries, the present embodiment calls out a plurality of configuration entries in a floating menu through a "signal source", when being clicked for an adjustment, the configuration entry floats on the current page, thus the playing screen will not be interrupted, and the configuration entries are allowed to be set through a file, thus making different television set models have different configuration entries.

In a specific implementation, first, in the step P100, when the smart television receives that the user has pressed the signal source button, an Android system broadcast method will be adopted to force the button to be distributed before outputting to the system and the application terminals of the smart television, making both the system and the application terminals be able to receive a signal source signal. In such a way, an application has no way to intercept the signal source signal, thus it is able to be received on any pages. Followed by entering the step S100, when the smart television receives a mandatory broadcast signal source, the floating menu is called out to any position on the current page, preferably, the floating menu locates at a right lower corner of the current page, of course, the floating menu is also possible to be adjusted to any other positions on the current page according to a habit of the user. The floating menu acquires a signal source channel, and obtains before displaying on the current page a plurality of configuration entries that the current smart television model requires to display according to a system file configuration, the configuration entries are dynamically sorted according to a current state of the system automatically. Wherein, when the configuration entry is clicked, the configuration entry itself floats alone and is highlighted on the current page, for adjusting by the user. Further, the floating menu will be automatically hidden after the user has completed the adjustment, if there is no display instruction received during a first preset time threshold, and the first preset time threshold is 5-60 seconds, preferably, the first preset time threshold is 8 seconds. Further, the configuration entry will be automatically quit after the user has completed the adjustment, if there is no adjustment instruction received during a second preset time threshold, the second preset time threshold is 5-30 seconds, preferably, the second preset time threshold is 10 seconds. Of course, after the adjustment is finished, the user may also press the "signal source" button to quit the floating menu.

Thus, it can be seen that in any scenes currently being played, the floating menu may be called out by pressing one button of the signal source button, and the commonly used configuration entries are directly adjusted therein. Since adopting a floating form design, when adjusting the configuration entries, the current viewing page is not necessary to be interrupted, the adjustment process is simple and fast, while being able to display different configuration entries on different models, in accordance with a configuration of the machine itself, and the user may make an adjustment intuitively, without any cumbersome steps, thus it has greatly shortened the adjustment process.

Figure 2:
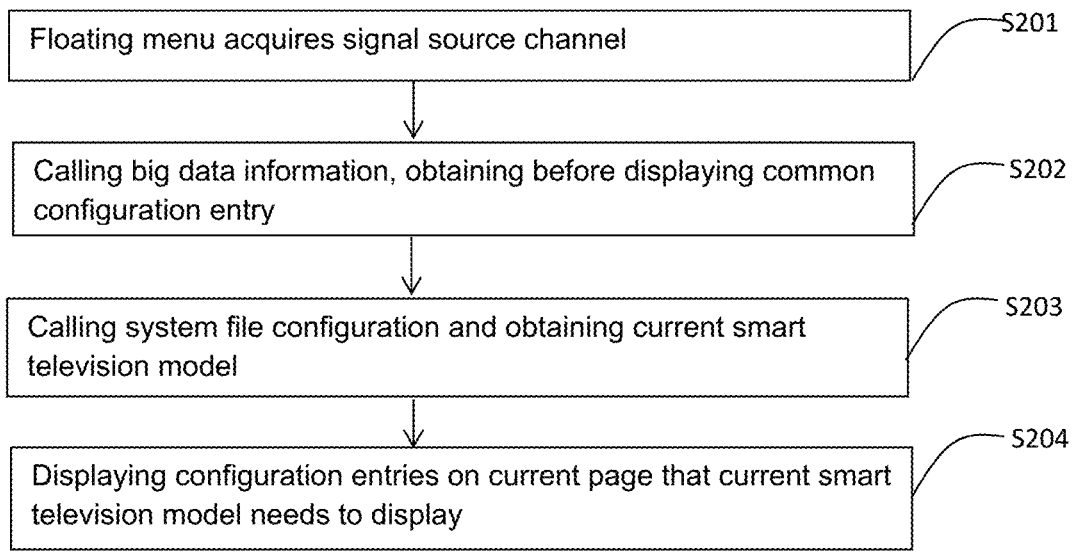
FIG. 2 illustrates a flowchart of displaying a configuration entry in a floating menu in a preferred embodiment on a smart television signal source-based method for displaying a floating menu described in the present invention.

Further, as shown in FIG. 2, the step S200 comprises specifically:

S201. The floating menu acquires the signal source channel.

S202. Calling big data information, obtaining before displaying a common configuration entry.

S203. Calling a system file configuration and obtaining the current smart television model.

S204. Displaying the configuration entries on the current page that the current smart television model needs to display.

In a specific implementation, the floating menu acquires the signal source channel first, then calls big data information, and obtains a plurality of commonly used configuration entries according to a calculation result of the big data, followed by calling a system file configuration and obtaining a model of the current smart television, and finally displays on the current page the configuration entries that the current smart television model needs to display.

It can be seen that, through calling the big data information to acquire the commonly used configuration entries of the smart television, combined with the model of the current smart television obtained from the system file configuration, and finally displaying the configuration entries on the current page that the current smart television model needs to display, it helps to eliminate a time for searching for the configuration entries, thus realizing an aim of a fast setting.

Figure 3:
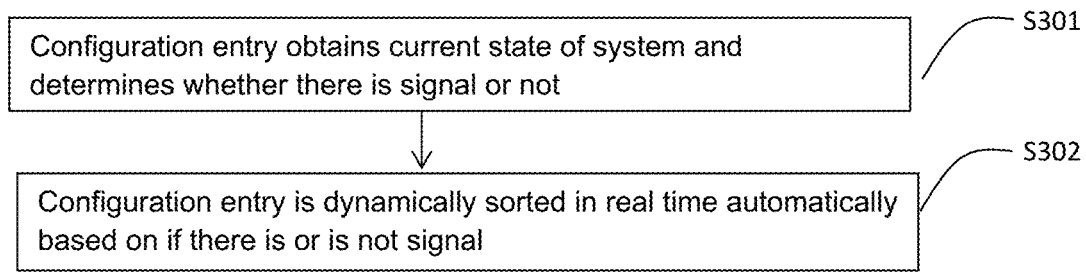
FIG. 3 illustrates a flowchart of sorting the configuration entries in a preferred embodiment on a smart television signal source-based method for displaying a floating menu described in the present invention.

Further, as shown in FIG. 3, the step S300 comprises specifically:

Step S301, the configuration entry obtains a current state of the system and determines whether there is a signal or not.

Step S302, the configuration entry is dynamically sorted in a real time automatically based on if there is or is not a signal.

During a specific implementation, in a preferred embodiment of the present invention, after the configuration entry has obtained a current state of the system, first if there is a signal or not will be determined, then the configuration entries are dynamically sorted in a real time automatically based on if there is or is not a signal. For example, if it is offline, a position of a network configuration entry will be placed ahead; when there is an upgrade package, then a position of an upgradation configuration entry will be placed ahead. Such a setting helps the user find a most needed configuration entry, thus facilitates the user.

Figure 4:
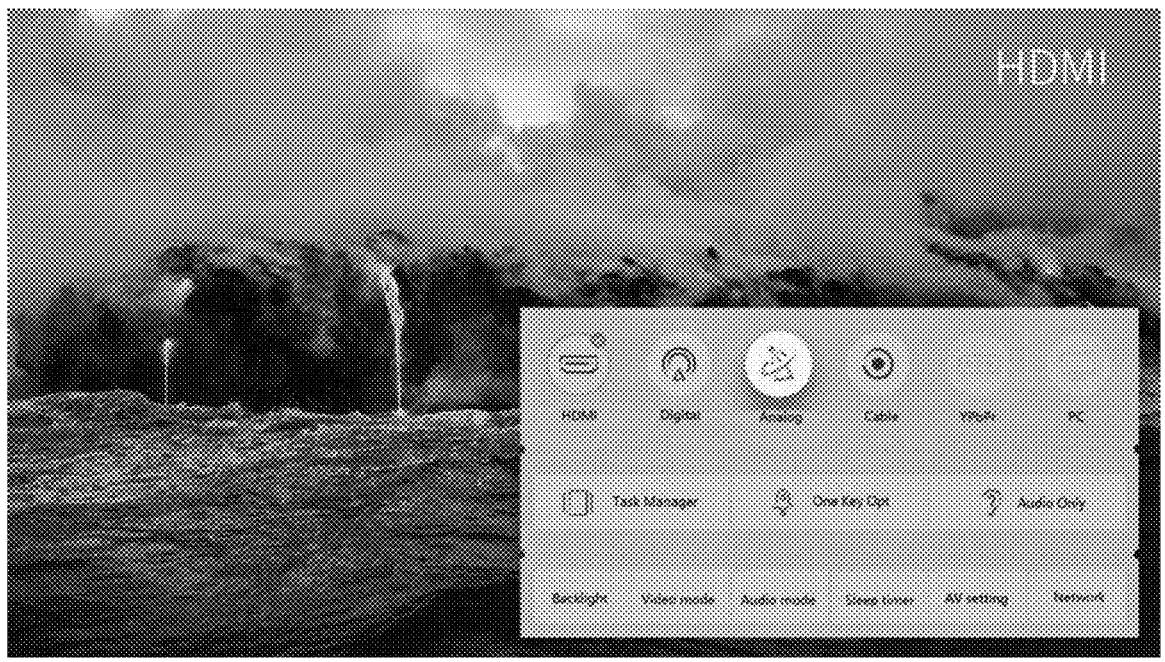
FIG. 4 illustrates a display status chart I on a configuration entry in the floating menu on any play interface in a preferred embodiment on a smart television signal source-based method for displaying a floating menu described in the present invention.
Figure 5:
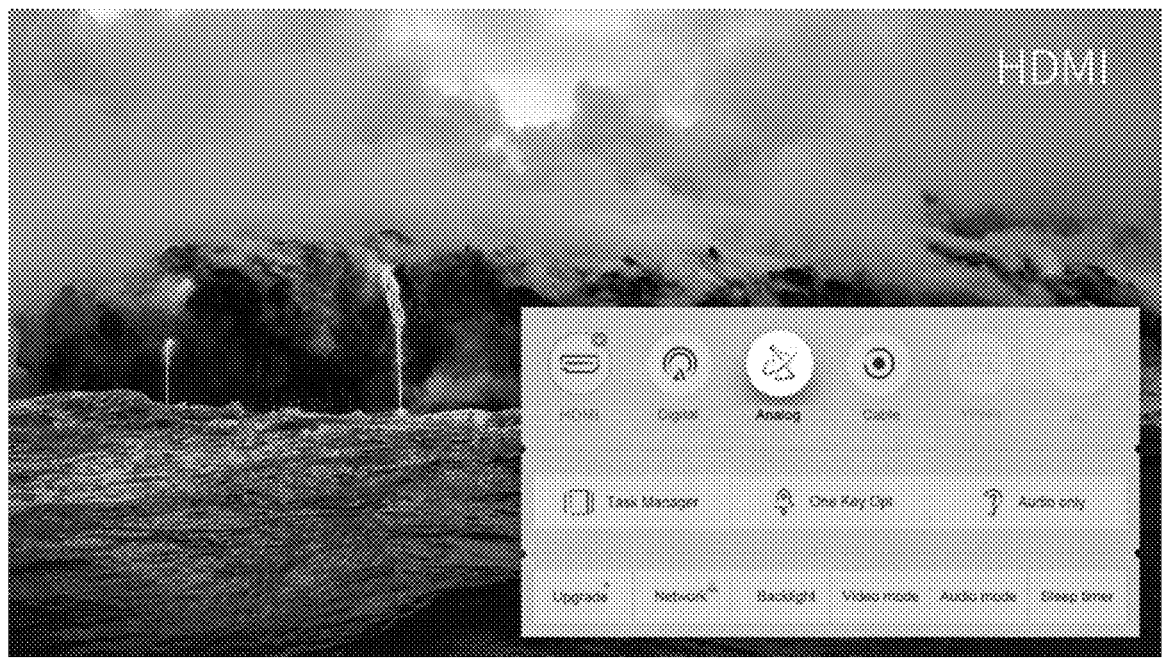
FIG. 5 illustrates a display status chart II on a configuration entry in the floating menu on any play interface in a preferred embodiment on a smart television signal source-based method for displaying a floating menu described in the present invention.
Figure 6:
FIG. 6 illustrates a display status chart III on a configuration entry in the floating menu on any play interface in a preferred embodiment on a smart television signal source-based method for displaying a floating menu described in the present invention.
Figure 7:
FIG. 7 illustrates a display status chart IV on a configuration entry in the floating menu on any play interface in a preferred embodiment on a smart television signal source-based method for displaying a floating menu described in the present invention.
Figure 8:
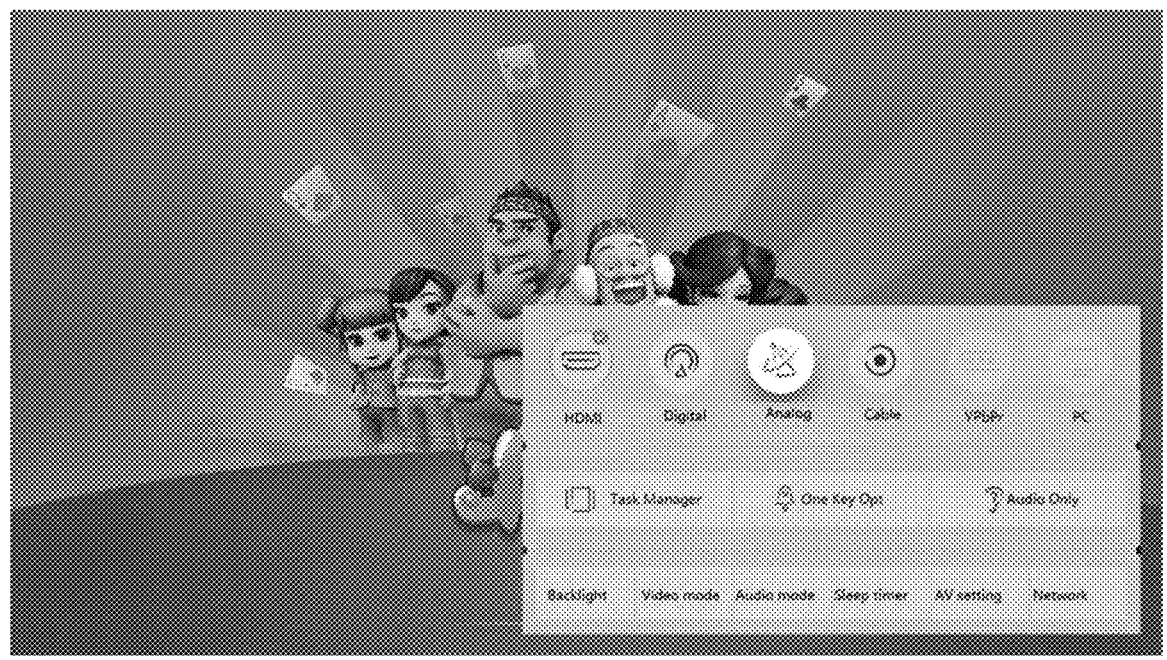
FIG. 8 illustrates a display status chart V on a configuration entry in the floating menu on any play interface in a preferred embodiment on a smart television signal source-based method for displaying a floating menu described in the present invention.
Figure 9:
FIG. 9 illustrates a display status chart VI on a configuration entry in the floating menu on any play interface in a preferred embodiment on a smart television signal source-based method for displaying a floating menu described in the present invention.

In a further embodiment, shown as FIGS. 4-9, under a display status of the configuration entries in the floating menu on any play interfaces, it is possible to quickly adjust the configuration entries. For example, FIG. 4 illustrates a status after calling the floating menu, which shows a plurality of most commonly used configuration entries after calculated by the smart TV through big data; FIG. 5 illustrates that when a network is not connected, a position of a network configuration entry will be placed ahead, or when there is an upgrade package, a position of an upgradation configuration entry will be placed ahead; FIG. 6 and FIG. 7 illustrate that, after the user has clicked "backlight" or "picture mode" configuration entry, the configuration entry floats on the current page, the user may directly click a left button or a right button to adjust a corresponding backlight or an image mode, such as a theater mode; FIG. 8 illustrates that when the user is playing a game, and finding a screen is too glaring, then a "signal source" button on a remote controller is pressed, then the floating menu will be floating at any position on a page, since it is displayed in an Android transparent form, thus one may call the menu out of the page, without quitting the game; because the user finds that a game screen is too glaring, thus a "backlight" configuration entry is chosen to adjust, as shown in FIG. 9, the "backlight" configuration entry is floating on the current page, and the user may quickly adjust to a satisfactory backlight.

The present invention further provides a smart television, wherein, comprising: a floating menu, while displaying the floating menu comprises a plurality of methods described above All above, the present embodiment provides a smart television signal source-based method for displaying a floating menu and a smart television, the method comprising: when a smart television receives a mandatory broadcast signal source, a floating menu is called out to any position on a current page; the floating menu acquires a signal source channel, obtains and displays on the current page a plurality of configuration entries that a current smart television model requires to display according to a system file configuration; and the configuration entries are dynamically sorted automatically according to a current state of the system. By means of calling out the floating menu to the current page when receiving the signal source, and displaying the configuration entries for the user to adjust, corresponding to the current smart television model according to the system file configuration, The present invention has effectively solved the problems in a current television that, when adjusting the configuration entries, it is required to enter the menu where the configuration entries locate after going through the homepage first, thus causing a regulation path to be long, a step to be tedious, and no way to directly view an adjustment effect of an image on a currently playing screen.

Certainly, those skilled in the art may understand that all or part of the processes of the method in the embodiments described above may be implemented by a plurality of related hardware (such as a processor, a controller, and more) instructed by a computer program, and the program may be stored in a computer readable storage medium, and when being executed, the program may include a plurality of processes of a plurality of various method embodiments as described above. Wherein the storage medium described therein may be a memory, a magnetic disk, an optical disk, or the like.

It should be understood that, the application of the present invention is not limited to the above examples listed. Ordinary technical personnel in this field can improve or change the applications according to the above descriptions, all of these improvements and transforms should belong to the scope of protection in the appended claims of the present invention.

What is claimed is:

1. A smart television signal source-based method for displaying a floating menu, comprising:
    detecting, by the smart television, that a user has pressed a button for a signal source of mandatory broadcast;
    in response to detecting that the user has pressed the button, adopting, by the smart television, an Android system broadcast method to force the button to be distributed and output to a system and a plurality of application terminals of the smart television, including:
        starting, by the smart television, the Android system broadcast;
        forcing, by the Android system broadcast, the button to be distributed and output to the system and the application terminals of the smart television;
    calling the floating menu out to any one position on a current page in response to the smart television forcing the button to be distributed;
    acquiring, for the floating menu, a signal source channel and a plurality of configuration entries that the current smart television model requires to display according to a system file configuration;
    dynamically sorting the configuration entries automatically according to a current state of the system; and
    simultaneously displaying, in the floating menu on the current page, the signal source channel and the sorted configuration entries, the sorted configuration entries including one or more configuration entries about television (TV) screen setting.

2. The smart television signal source-based method for displaying a floating menu according to claim 1, further comprising:
    when a configuration entry of the sorted configuration entries is clicked, highlighting and floating the configuration entry itself alone on the current page, to receive an adjustment by a user.

3. The smart television signal source-based method for displaying a floating menu according to claim 2, wherein:
    the configuration entry is called out by the floating menu through the signal source in any one playing scene, and the configuration entry is floating on the current page when being clicked for the adjustment, without interrupting a scene currently on play; and the configuration entries are configured through a file, and different television models are configured with different configuration entries.

4. The smart television signal source-based method for displaying a floating menu according to claim 3, further comprising:
    after completing the adjustment, if it is detected that the user presses a button for the signal source again, quitting the floating menu.

5. The smart television signal source-based method for displaying a floating menu according to claim 2, further comprising:
    automatically hiding the floating menu after the user has completed the adjustment, if there is no display instruction received during a first preset time threshold.

6. The smart television signal source-based method for displaying a floating menu according to claim 5, wherein the first preset time threshold is 5-60 seconds.

7. The smart television signal source-based method for displaying a floating menu according to claim 2, further comprising:
    automatically quitting the configuration entry after the user has completed the adjustment, if there is no adjustment instruction received during a second preset time threshold.

8. The smart television signal source-based method for displaying a floating menu according to claim 7, wherein the second preset time threshold is 5-30 seconds.

9. The smart television signal source-based method for displaying a floating menu according to claim 1, wherein acquiring, for the floating menu, a signal source channel and a plurality of configuration entries comprises:
    acquiring, by the floating menu, the signal source channel;
    calling big data information to obtain a common configuration entry;
    displaying the common configuration entry;
    calling a system file configuration and obtaining the current smart television model;
    displaying the configuration entries on the current page that the current smart television model needs to display.

10. The smart television signal source-based method for displaying a floating menu according to claim 1, wherein dynamically sorting the configuration entries automatically according to the current state of the system comprises:
    obtaining, according to the configuration entries, the current state of the system and determining whether there is a signal or not for each configuration entry;
    dynamically sorting in a real time automatically based on whether there is a signal or not for each configuration entry.

11. The smart television signal source-based method for displaying a floating menu according to claim 10, further comprising:
    determining that there is no signal for a network configuration entry;

placing a position of the network configuration entry ahead in the floating menu, the network configuration entry being configured to receive network information for connecting the smart television to a network.

12. The smart television signal source-based method for displaying a floating menu according to claim 10, further comprising:

determining that there is a signal for a package update configuration entry;

placing a position of the package update configuration entry ahead in the floating menu, the package update configuration entry being configured to initiate an update for a program in the smart television.

13. The method according to claim 1, wherein the one or more configuration entries about TV screen settings include a configuration entry for backlight setting and a configuration entry for picture mode.

14. The method according to claim 1, wherein the sorted configuration entries further include at least one of a configuration entry for audio setting, a network configuration entry, and a configuration entry for sleep timer.

15. A smart television, comprising:

a display device; and a processor configured to display a floating menu on the display device, comprising:

detecting, by the smart television, that a user has pressed a button for a signal source of mandatory broadcast;

in response to detecting that the user has pressed the button, adopting, by the smart television, an Android system broadcast method to force the button to be distributed and output to a system and a plurality of application terminals of the smart television, including:

starting, by the smart television, the Android system broadcast;

forcing, by the Android system broadcast, the button to be distributed and output to the system and the application terminals of the smart television;

calling the floating menu out to any one position on a current page in response to the smart television forcing the button to be distributed;

acquiring, for the floating menu, a signal source channel and a plurality of configuration entries that the current smart television model requires to display according to a system file configuration;

dynamically sorting the configuration entries automatically according to a current state of the system; and simultaneously displaying, in the floating menu on the current page, the signal source channel and the sorted configuration entries, the sorted configuration entries including one or more configuration entries about television (TV) screen setting.

* * * * *